United States Patent
Yamanaka et al.

(10) Patent No.: US 6,920,020 B2
(45) Date of Patent: Jul. 19, 2005

(54) THIN-FILM MERGED MAGNETIC HEAD HAVING A HEAT-GENERATING LAYER

(75) Inventors: Noboru Yamanaka, Tokyo (JP); Norikazu Ota, Tokyo (JP)

(73) Assignee: TDK Corporation, Tokyo (JP)

(*) Notice: Subject to any disclaimer, the term of this patent is extended or adjusted under 35 U.S.C. 154(b) by 130 days.

(21) Appl. No.: 10/421,880

(22) Filed: Apr. 24, 2003

(65) Prior Publication Data

US 2003/0235014 A1 Dec. 25, 2003

(30) Foreign Application Priority Data

Jun. 21, 2002 (JP) ........................................ 2002-181810

(51) Int. Cl.⁷ .................................................. G11B 5/56
(52) U.S. Cl. ...................... 360/317; 360/128; 360/294.7
(58) Field of Search ............................. 360/317–318.1, 360/128

(56) References Cited

U.S. PATENT DOCUMENTS 5,638,237 A * 6/1997 Phipps et al. ................ 360/128
5,991,113 A    11/1999 Meyer et al.
2002/0191326 A1   12/2002 Xu et al.

FOREIGN PATENT DOCUMENTS

| JP | A 5-20635 | 1/1993 |
| JP | A1-WO2002/037480 | 5/2002 |
| JP | A-2003-272335 | 9/2003 |

* cited by examiner

Primary Examiner—A. J. Heinz
(74) Attorney, Agent, or Firm—Oliff & Berridge, PLC

(57) ABSTRACT

In the thin-film magnetic head of the present invention, the distance to a heat-generating layer is shorter from the end part on the side facing, a recording medium in a magnetoresistive device than from the end part on the side facing the recording medium in an electromagnetic transducer. Therefore, even when the thin-film magnetic head tilts so that its electromagnetic transducer side approaches the recording medium when floating up from the recording medium, the amount of thermal expansion caused by the heat from the heat-generating layer is greater in the magnetoresistive device than in the electromagnetic transducer. This reduces the gap between the magnetoresistive device and the recording medium, whereby a high reproducing output can be obtained.

14 Claims, 11 Drawing Sheets

THIN-FILM MERGED MAGNETIC HEAD HAVING A HEAT-GENERATING LAYER

BACKGROUND OF THE INVENTION

1. Field of the Invention

The present invention relates to a combination thin-film magnetic head in which a magnetoresistive (MR) device and an induction type electromagnetic transducer are laminated together, a head gimbal assembly, and a hard disk drive.

2. Related Background Art

Thin-film magnetic heads have been configured so as to float up from a hard disk, which is a recording medium, at the time of recording and reproducing with respect to a hard disk drive. Specifically, a thin-film magnetic head is mounted on gimbals, which are attached to a leading end part of a flexible suspension arm, so as to constitute a head gimbal assembly (HGA). As an airflow caused by a rotation of the hard disk runs under the thin-film magnetic head, the suspension arm flexes, whereby the head floats up.

As the hard disk has been attaining a higher density, the gap between the thin-film magnetic head and the hard disk, i.e., head flying height, has been decreasing from 20 nm to 15 nm and further to 10 nm, thus reaching a limit. In such a state where the head flying height is very small, it is necessary for an electromagnetic transducer for writing and a magnetoresistive device for reading to control their distances from the hard disk appropriately.

SUMMARY OF THE INVENTION

In a combination thin-film magnetic head in which a magnetoresistive device for reading and an induction type electromagnetic transducer for writing are laminated on a support in this order, the hard disk rotates from the support toward the electromagnetic transducer, whereby an airflow runs in this direction. In this case, in order for the vicinity of the magnetoresistive device to be located closest to the recording medium, the form of the surface opposing the hard disk is usually designed such that the flying height becomes greater on the support side and smaller in the magnetoresistive device. However, since the thin-film magnetic head tilts forward (in the hard disk rotating direction) when floating up as such, the distance from the hard disk becomes longer to the magnetoresistive device than to the induction type electromagnetic transducer. Namely, even when the head flying height can be set to a small value, this height is a value obtained in the vicinity of the electromagnetic transducer located near the hard disk, whereas the gap between the magnetoresistive device and the hard disk may not be minimized. When the distance between the magnetoresistive device and the hard disk is long, a high reproducing output is hard to obtain.

For overcoming the problem mentioned above, it is an object of the present invention to provide a thin-film magnetic head, a head slider, a head gimbal assembly, and a hard disk drive, which can attain a high reproducing output by reducing the gap between a magnetoresistive device and a recording medium.

The present invention provides a thin-film magnetic head comprising a magnetoresistive device for reading, an induction type electromagnetic transducer for writing, and a heat-generating layer adapted to generate heat when energized, the heat-generating layer being formed at a position closer to an end part on a side facing a recording medium in the magnetoresistive device than an end part on the side facing the recording medium in the electromagnetic transducer.

In the thin-film magnetic head of the present invention, the distance to the heat-generating layer is shorter from the end part on the side facing the recording medium in the magnetoresistive device than from the end part on the side facing the recording medium in the electromagnetic transducer. Therefore, even in the case where the thin-film magnetic head tilts so that its electromagnetic transducer side approaches the recording medium when floating up from the recording medium, the amount of thermal expansion caused by the heat from the heat-generating layer is greater in the magnetoresistive device than in the electromagnetic transducer. This reduces the gap between the magnetoresistive device and the recording medium, whereby a high reproducing output can be obtained.

The thin-film magnetic head of the present invention may be configured such that the electromagnetic transducer comprises a first magnetic pole; and a second magnetic pole, magnetically connected to the first magnetic pole, holding the first magnetic pole between the second magnetic pole and the magnetoresistive device; a distance between the heat-generating layer and the end part on the side facing the recording medium in the magnetoresistive device being shorter than a distance between the heat-generating layer and a midpoint between the first and second magnetic poles on the side facing the recording medium.

Preferably, in the thin-film magnetic head of the present invention, the heat-generating layer is formed on a side opposite from the side facing the recording medium in the magnetoresistive device. When the heat-generating layer is formed on the backside of the magnetoresistive device as seen from the side facing the recording medium as such, it becomes easier for the heat-generating layer to heat the magnetoresistive device than the electromagnetic transducer.

Preferably, the magnetoresistive device is disposed between a lower shield layer formed from a magnetic material and an upper shield layer formed from a magnetic material, whereas the heat-generating layer and the lower shield layer are formed on the same layer. The heat-generating layer and the upper shield layer may be formed on the same layer as well. In such a configuration, the heat-generating layer and the lower or upper shield layer can be formed by the same process such as plating, for example, whereby the thin-film magnetic head can be made easily. Further, the heat-generating layer and the magnetoresistive device may be formed on the same layer. In this case, the heat-generating layer and the magnetoresistive device can be formed by the same process such as sputtering, for example, whereby the thin-film magnetic head can be made easily.

In the thin-film magnetic head of the present invention, the heat-generating layer may be formed between the magnetoresistive device and the electromagnetic transducer. Even when the heat-generating layer is formed at such a position, the distance from the heat-generating layer is made shorter to the magnetoresistive device than to the electromagnetic transducer, whereby the amount of thermal expansion becomes greater in the magnetoresistive device than in the electromagnetic transducer.

Preferably, in the thin-film magnetic head of the present invention, the magnetoresistive device is positioned between the magnetoresistive device and a predetermined support, whereas the heat-generating layer is formed between the support and the magnetoresistive device. When the heat-generating layer is formed at such a position, it becomes easier for the heat-generating layer to heat the magnetoresistive device than the electromagnetic transducer.

Preferably, in the thin-film magnetic head of the present invention, a shield layer formed from a magnetic material is formed between the heat-generating layer and the magnetoresistive device. Though a magnetic field occurs when the heat-generating layer is energized, such a shield layer can absorb the magnetic field, thereby keeping the magnetoresistive device from sensing unnecessary magnetic fields.

In this case, it will be preferred if the shield layer comprises a first layer covering at least a part of one side of the heat-generating layer; a second layer covering at least a part of the other side of the heat-generating layer; and a third layer, positioned on the side facing the recording medium in the heat-generating layer, connecting the first and second layers to each other. When the respective sides where the magnetoresistive device and the electromagnetic transducer are located are referred to as lower and upper sides, the third layer covers the side facing the recording medium in the heat-generating layer while the first and second layers cover the lower and upper sides, respectively, whereby the magnetoresistive device can further be prevented from sensing unnecessary magnetic fields.

Preferably, in this case, the magnetoresistive device is disposed between a lower shield layer formed from a magnetic material and an upper shield layer formed from a magnetic material, the lower shield layer and the first layer of the shield layer are formed on the same layer, and the upper shield layer and the heat-generating layer are formed on the same layer. In such a configuration, the lower shield layer and the first layer in the shield layer can be formed by the same process, whereas the upper shield layer and the heat-generating layer can be formed by the same process.

Preferably, in the thin-film magnetic head of the present invention, the heat-generating layer has a structure comprising a line winding after turning at a predetermined position. When the heat-generating layer has such a form, respective magnetic fields occurring from neighboring turned parts of the line cancel each other out, whereby the magnetoresistive device can be restrained from sensing unnecessary magnetic fields.

The present invention provides a head gimbal assembly and a hard disk drive, each comprising a thin-film magnetic head, the thin-film magnetic head comprising a magnetoresistive device for reading, an induction type electromagnetic transducer for writing, and a heat-generating layer adapted to generate heat when energized, the heat-generating layer being formed at a position closer to an end part on a side facing a recording medium in the magnetoresistive device than an end part on the side facing the recording medium in the electromagnetic transducer.

In the head gimbal assembly and hard disk drive of the present invention, the distance to the heat-generating layer is shorter from the end part on the side facing the recording medium in the magnetoresistive device than from the end part on the side facing the recording medium in the electromagnetic transducer. Therefore, even when the thin-film magnetic head tilts so that its electromagnetic transducer side approaches the recording medium when floating up from the recording medium, the amount of thermal expansion caused by the heat from the heat-generating layer is greater in the magnetoresistive device than in the electromagnetic transducer. This reduces the gap between the magnetoresistive device and the recording medium, whereby a high reproducing output can be obtained.

BRIEF DESCRIPTION OF THE DRAWINGS

The present invention may be more readily described with reference to the accompanying drawings, in which.

DESCRIPTION OF THE PREFERRED EMBODIMENTS

In the following, preferred embodiments of the thin-film magnetic head, head gimbal assembly, and hard disk drive in accordance with the present invention will be explained in detail with reference to the accompanying drawings. Constituents identical to each other will be referred to with numerals identical to each other, without repeating their overlapping explanations.

Figure 1:
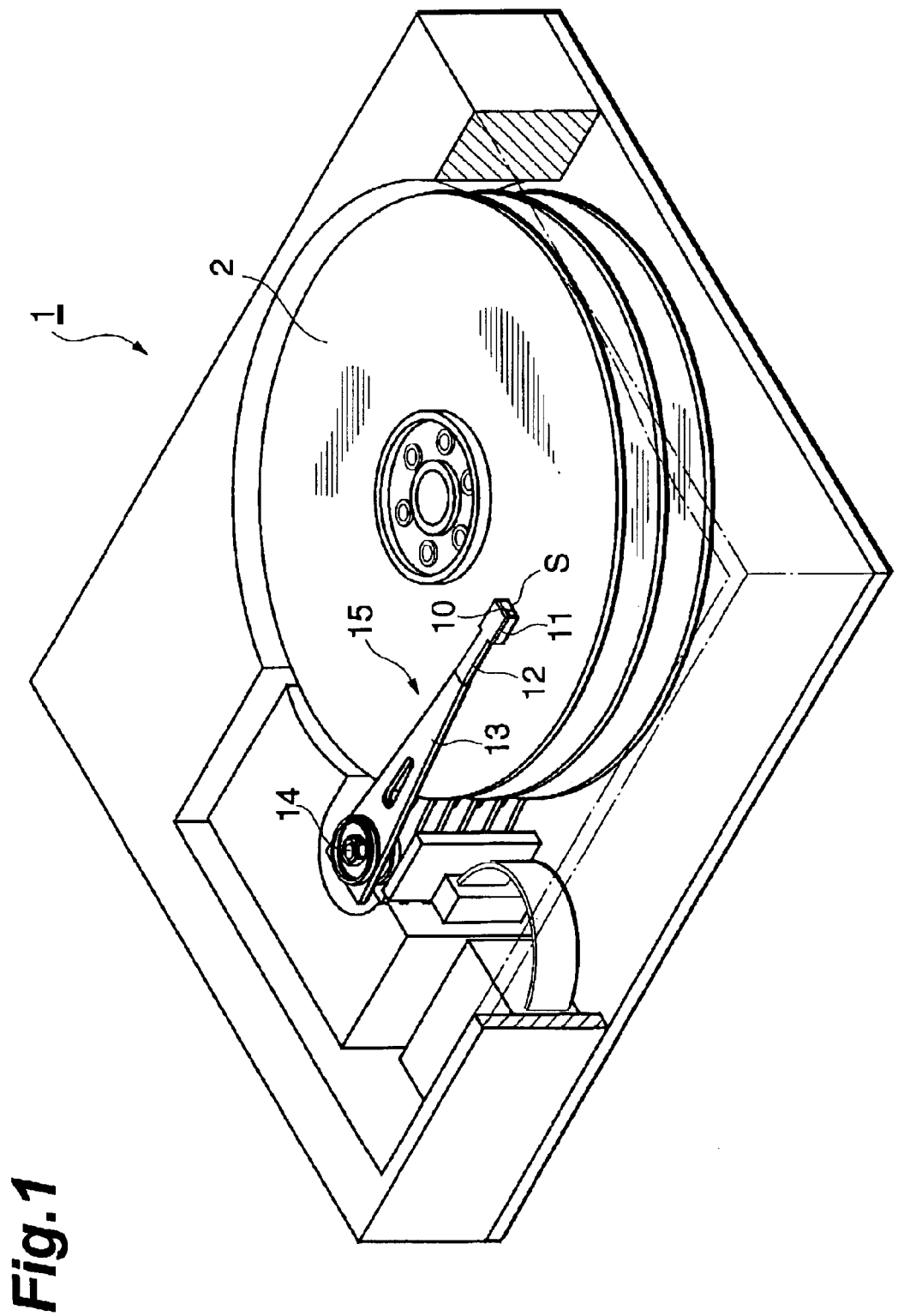
FIG. 1 is a perspective view showing an embodiment of the hard disk drive in accordance with the present invention.

FIG. 1 is a view showing a hard disk drive equipped with a thin-film magnetic head in accordance with an embodiment. This hard disk drive 1 actuates a head gimbal assembly (HGA) 15, so as to cause a thin-film magnetic head 10 to record and reproduce magnetic information with respect to a recording surface (the upper face in FIG. 1) of a hard disk 2 rotating at a high speed. The head gimbal assembly 15 comprises gimbals 12 mounted with a head slider 11 formed with the thin-film magnetic head 10, and a suspension arm 13 connected to the gimbals 12; and is rotatable about a shaft 14 by a voice coil motor, for example. When the head gimbal assembly 15 is rotated, the head slider 11 moves radially of the hard disk 2, i.e., in a direction traversing track lines.

Figure 2:
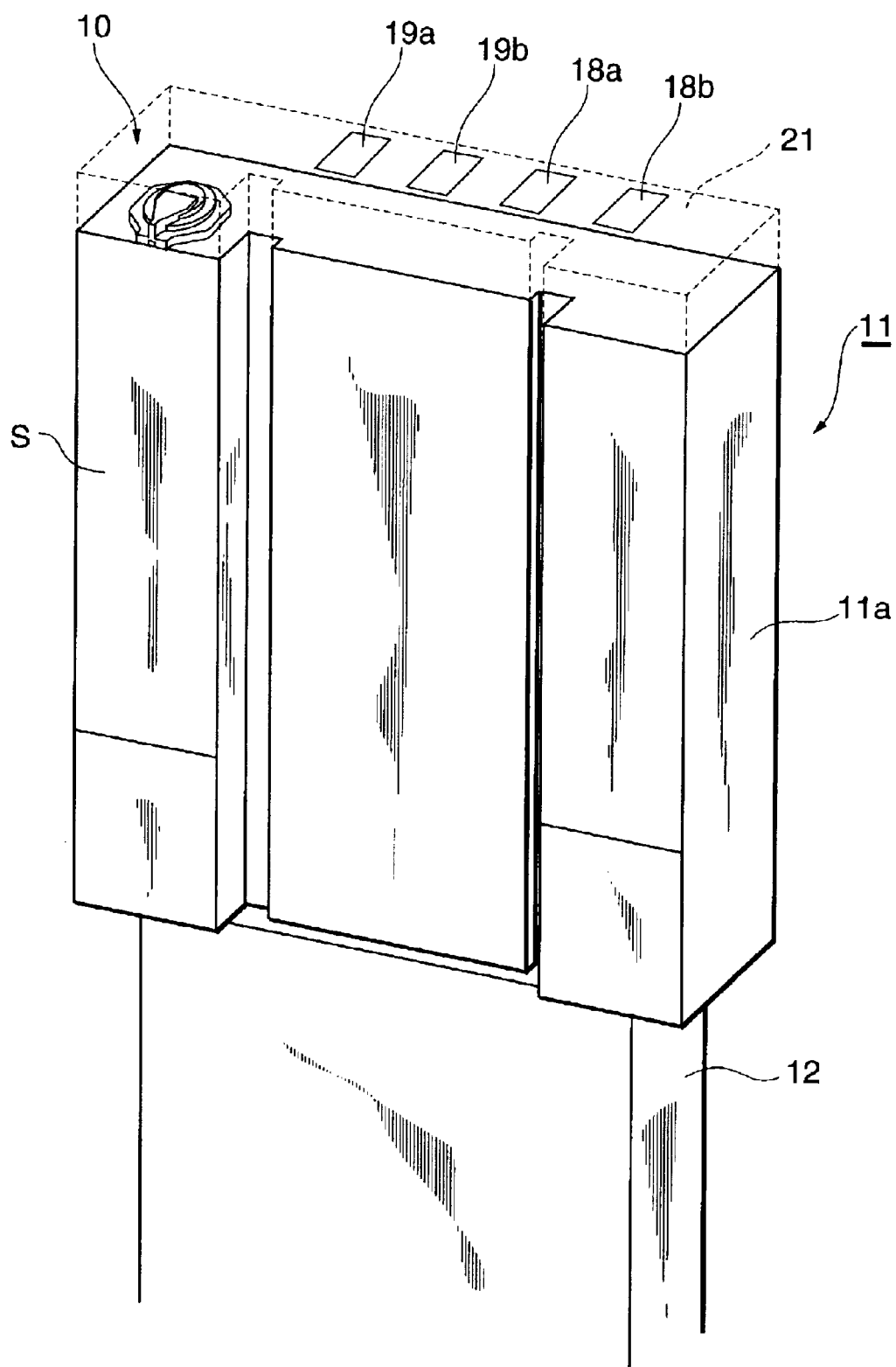
FIG. 2 is a perspective view showing a head slider.

FIG. 2 is an enlarged perspective view of the head slider 11. The head slider 11 comprises a support 11a having a substantially rectangular parallelepiped form made of AlTiC ($Al_2O_3.TiC$), on which the thin-film magnetic head 10 is formed. The surface on the front side in the drawing is a surface opposing the recording surface of the hard disk 2, and is referred to as air bearing surface (ABS) S. When the hard disk 2 rotates, the head slider 11 floats up because of an airflow caused by the rotation, whereby the air bearing surface S is separated from the recording surface of the hard disk 2. Recording pads 18a, 18b and reproducing pads 19a, 19b are attached to the thin-film magnetic head 10, whereas wires (not depicted), connected to the individual pads, for inputting/outputting electric signals are attached to the suspension arm 13 shown in FIG. 1. For protecting the thin-film magnetic head 10, an overcoat layer 21 indicated by broken lines in the drawing is provided. The air bearing surface S may be coated with DLC (Diamond Like Carbon) or the like.

Figure 3:
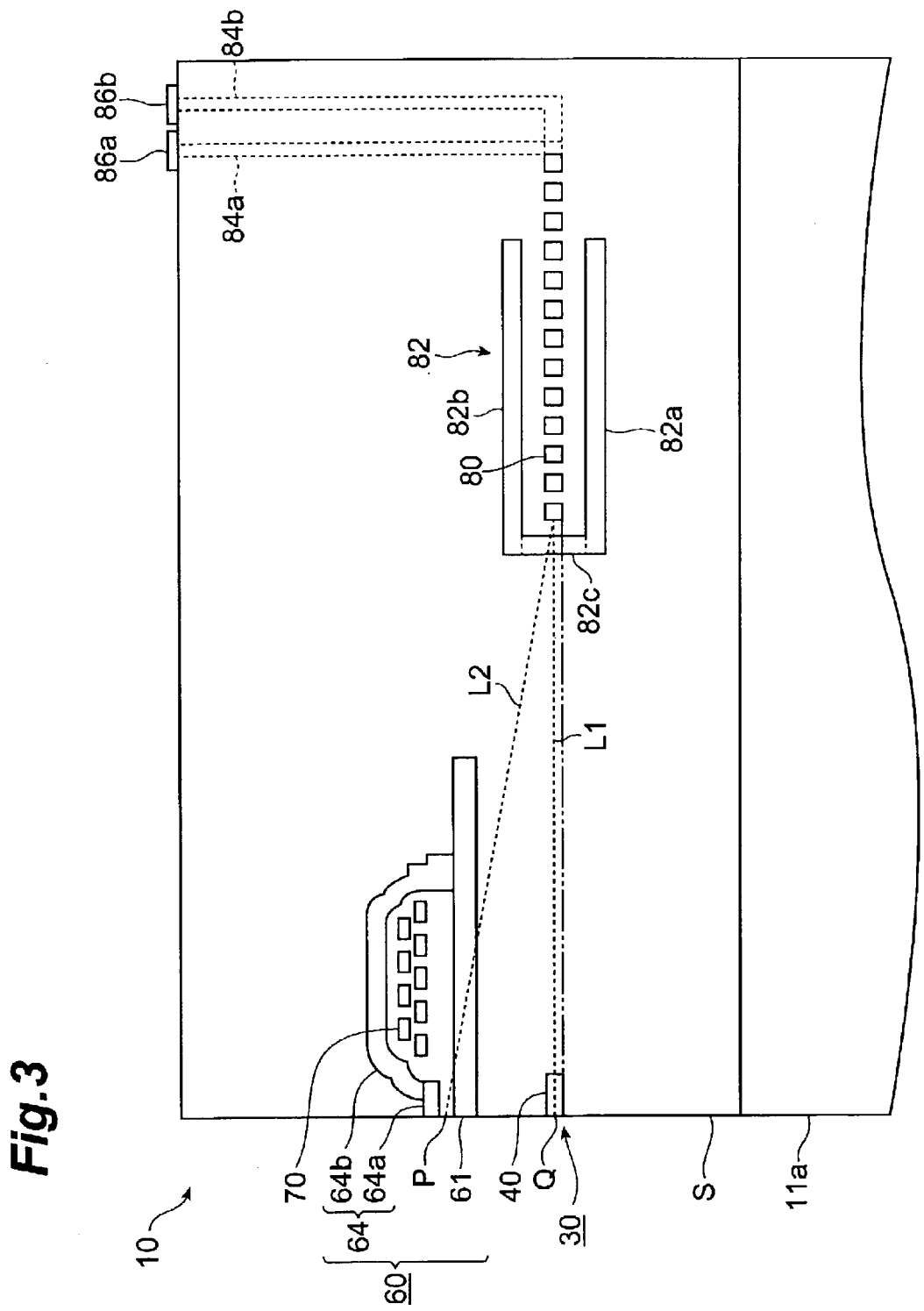
FIG. 3 is a schematic view showing an embodiment of the thin-film magnetic head in accordance with the present invention.

FIG. 3 is schematic view taken in a direction perpendicular to the air bearing surface S in the thin-film magnetic head 10, illustrating major parts of this embodiment. The thin-film magnetic head 10 is a combination thin-film magnetic head in which a reproducing head section 30 having a GMR (Giant Magneto Resistive) device 40 for reading and a recording head section 60 acting as an induction type electromagnetic transducer for writing are laminated on the support 11a. The GMR device utilizes a giant magnetoresistive effect yielding a high magnetoresistance change ratio.

The recording head section 60 employs so-called in-plane recording, and mainly comprises a lower magnetic pole (first magnetic pole) 61; an upper magnetic pole (second magnetic pole) 64, magnetically connected to the lower magnetic pole 61, holding the lower magnetic pole 61 between the upper magnetic pole 64 and the GMR device 40; and a thin-film coil 70 having a part thereof positioned between the lower magnetic pole 61 and the upper magnetic pole 64. The upper magnetic pole 64 is constituted by a magnetic pole part layer 64a positioned on the air bearing surface S side; and a yoke part layer 64b, connected to the magnetic pole part layer 64a, bypassing the thin-film coil 70 thereunder.

Further, in this embodiment, the side of GMR device 40 opposite from the air bearing surface S, i.e., the rear side of the GMR device 40 as seen from the air bearing surface S, is provided with a heat-generating layer 80 formed from Cu, NiFe, Ta, Ti, CoNiFe alloy, FeAlSi alloy, or the like. Electrically conductive parts 84a, 84b made of an electrically conductive material such as Cu extending upward in the drawing are electrically connected to the heat-generating layer 80, whereas electrode pads 86a, 86b are attached to the upper ends of the electrically conductive parts 84a, 84b, respectively.

Figure 4:
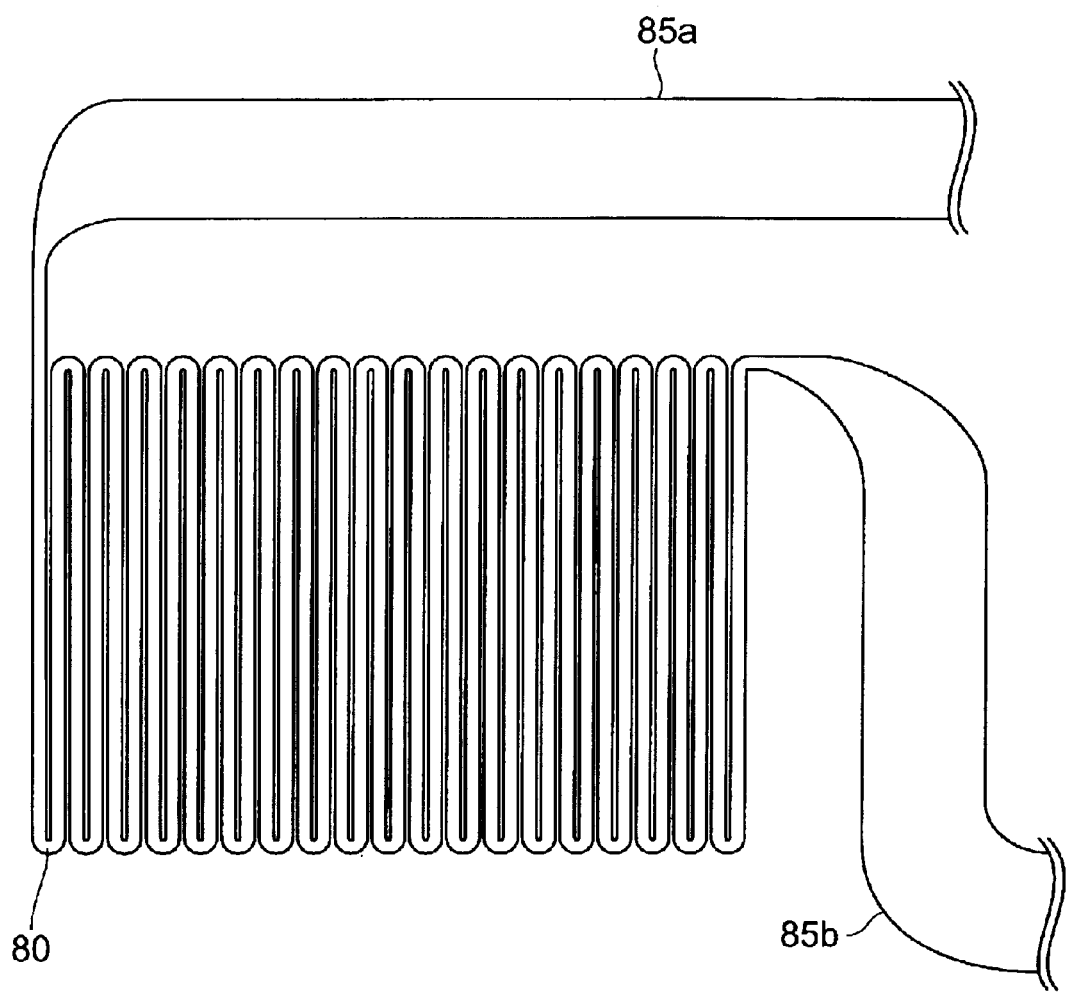
FIG. 4 is a view showing an example of heat-generating layer.

FIG. 4 is a plan view of the heat-generating layer 80. The air bearing surface S is located on the left side in the drawing. Thus, the heat-generating layer 80 has a structure in which a single line is winding, whereas extraction electrodes 85a, 85b are connected to both ends of the line, respectively. The extraction electrodes 85a, 85b are connected to the electrically conductive parts 84a, 84b shown in FIG. 3, respectively. For example, the heat-generating layer 84 has such dimensions that the line winding pitch is 3 μm, the line width is 2 μm, and the gap between neighboring parts of the line is 1 μm. When a voltage is applied between the electrode pads 86a, 86b so as to energize the heat-generating layer 80 (e.g., cause a current of about 20 mA to flow therethrough), the heat-generating layer 80 generates heat.

Referring to FIG. 3 again, the position of the heat-generating layer 80 will be explained in detail. The heat-generating layer 80 is located on the same layer as with the GMR device 40 (see the dash-double-dot line), and is formed at a position closer to an end part Q on the air bearing surface S side in the GMR device 40 than an end part on the air bearing surface S side in the electromagnetic transducer, which is more specifically the midpoint P between the upper magnetic pole 64 and lower magnetic pole 61 on the air bearing surface S side. Namely, distance L1 is shorter than distance L2 as shown FIG. 3.

Figure 5:
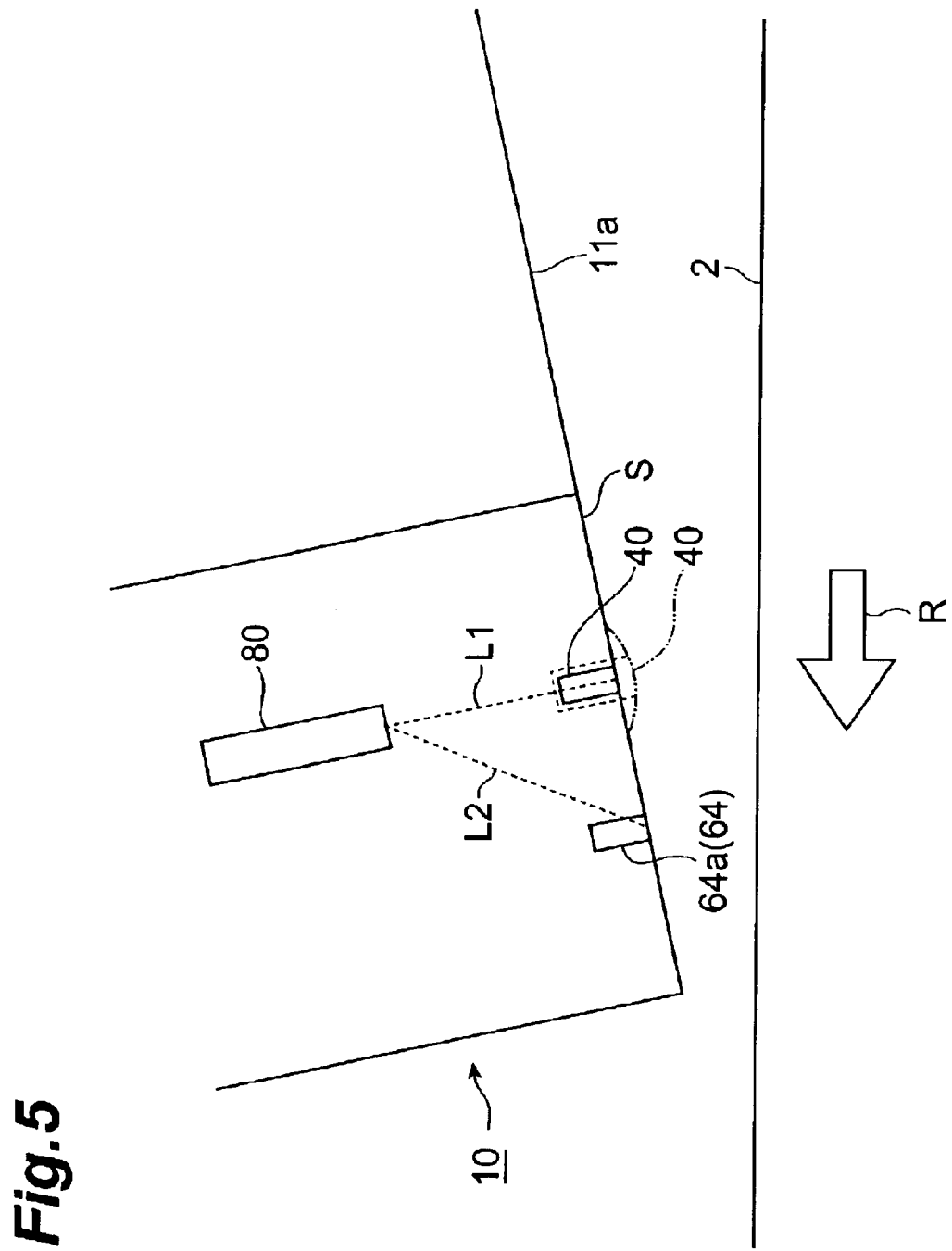
FIG. 5 is a view showing a state where a magnetoresistive device thermally expands.

Effects of thus configured thin-film magnetic head 10, head slider 11, head gimbal assembly 15, and hard disk drive 1 will now be explained. As shown in FIG. 5, when the hard disk 2 rotates in the direction of arrow R in the drawing, the thin-film magnetic head 10 floats up because of an airflow, thereby attaining a forward-leaning posture (forward-tilted posture) so that the upper magnetic pole 64 side of the electromagnetic transducer approaches the hard disk 2. When the heat-generating layer 80 is energized in this case, the heat from the heat-generating layer 80 thermally expands its surrounding layers. Here, since distance L1 is set shorter than distance L2 as mentioned above, the amount of thermal expansion is greater in the GMR device 40 (the thermally expanded state of GMR device 40 being indicated by the dash-double-dot line) than in the magnetic pole layer 64a of the upper magnetic pole 64. This reduces the gap between the GMR device 40 and the hard disk 2, thereby yielding a high reproducing output.

Further, as shown in FIG. 3, a shield layer 82 made of a magnetic material such as NiFe, FeAlSi alloy, or the like is formed between the heat-generating layer 80 and the GMR device 40. Though a magnetic field occurs when the heat-generating layer 80 is energized, such a shield layer 82 can absorb the magnetic field, thereby keeping the GMR device 40 from sensing unnecessary magnetic fields at the time of reproducing.

The shield layer 82 is constituted by a first layer 82a covering at least a part of the bottom face of the heat-generating layer 80; a second layer 82b covering at least a part of the upper face of the heat-generating layer 80; and a third layer 82c, positioned on the air bearing surface S side of the heat-generating layer 80, connecting the first layer 82a and second layer 82b to each other. When the third layer 82c covers the heat-generating layer 80 on the air bearing surface S side, whereas the first layer 82a and second layer 82b cover the lower and upper sides thereof, respectively, the GMR device 40 can effectively be prevented from sensing unnecessary magnetic fields. For improving the ratio of blocking magnetic fields from the heat-generating layer 80, it is preferred that the width of the first layer 82a, second layer 82b, and third layer 82c as seen from the air bearing surface S be made greater than the width of the heat-generating layer 80. The first layer 82a and second layer 82b may also have such dimensions as to cover the heat-generating layer 80 not partly but wholly.

With reference to schematic views of FIGS. 6A to 6D, other embodiments in accordance with the present invention will now be explained. As depicted in each drawing, a lower shield layer 32 is formed under the GMR device 40, whereas an upper shield layer 38 is formed between the GMR device 40 and the electromagnetic transducer. The upper shield layer 38 and the lower shield layer 32 are made of a magnetic material such as permalloy. In the embodiment shown in FIG. 6A, the heat-generating layer 80 is formed on the same layer as with the lower shield layer 32 as can be seen from the broken line connecting their bottom parts. In this case, the heat-generating layer 80 and the lower shield layer 32 can be formed by the same process such as plating, for example, whereby the process of making a thin-film magnetic head can be simplified.

Figure 6A:
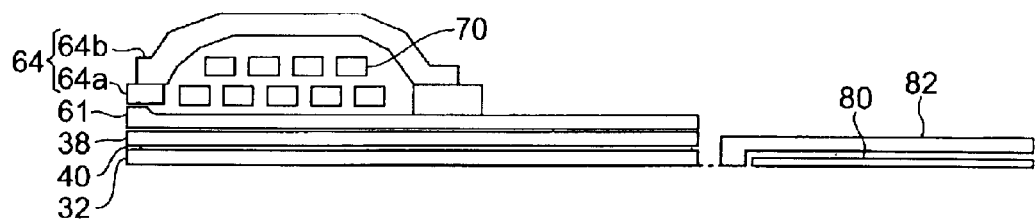
FIGS. 6A to 6D are schematic views showing other embodiments of the thin-film magnetic head in accordance with the present invention.
Figure 6B:
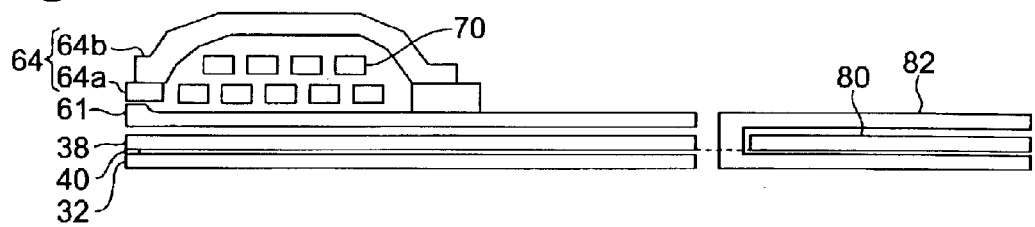

In the embodiment shown in FIG. 6B, the heat-generating layer 80 is formed on the same layer as with the upper shield layer 38. In this case, the heat-generating layer 80 and the upper shield layer 38 can be formed by the same process, for example, whereby the process of making a thin-film magnetic head can be simplified.

Figure 6C:
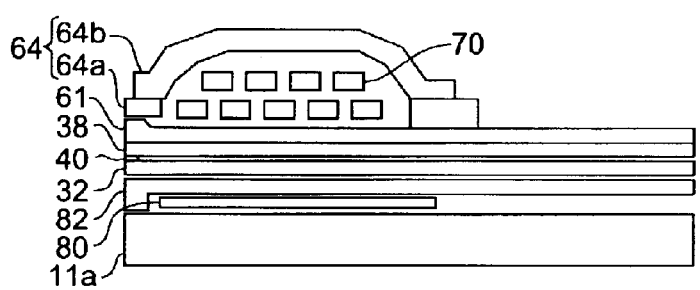

In the embodiment shown in FIG. 6C, the heat-generating layer 80 is formed between the support 11a and the GMR device 40, i.e., located closer to the support 11a than is the GMR device 40. Forming the heat-generating layer 80 at such a position can make the difference between distances L1 and L2 greater than that in the embodiment shown in FIG. 3, thereby making it easier for the heat-generating layer 80 to heat the GMR device 40 than the electromagnetic transducer.

Figure 6D:
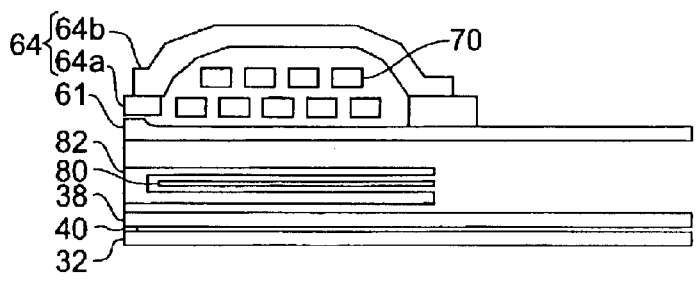

In the mode shown in FIG. 6D, the heat-generating layer 80 is formed, between the GMR device 40 and lower magnetic pole 61, at a position closer to the GMR device 40 than the midpoint between the upper magnetic pole 64 and lower magnetic pole 61 on the air bearing surface side. Such a configuration can also make the amount of thermal expansion greater in the GMR device 40 than in the electromagnetic transducer.

Figure 7:
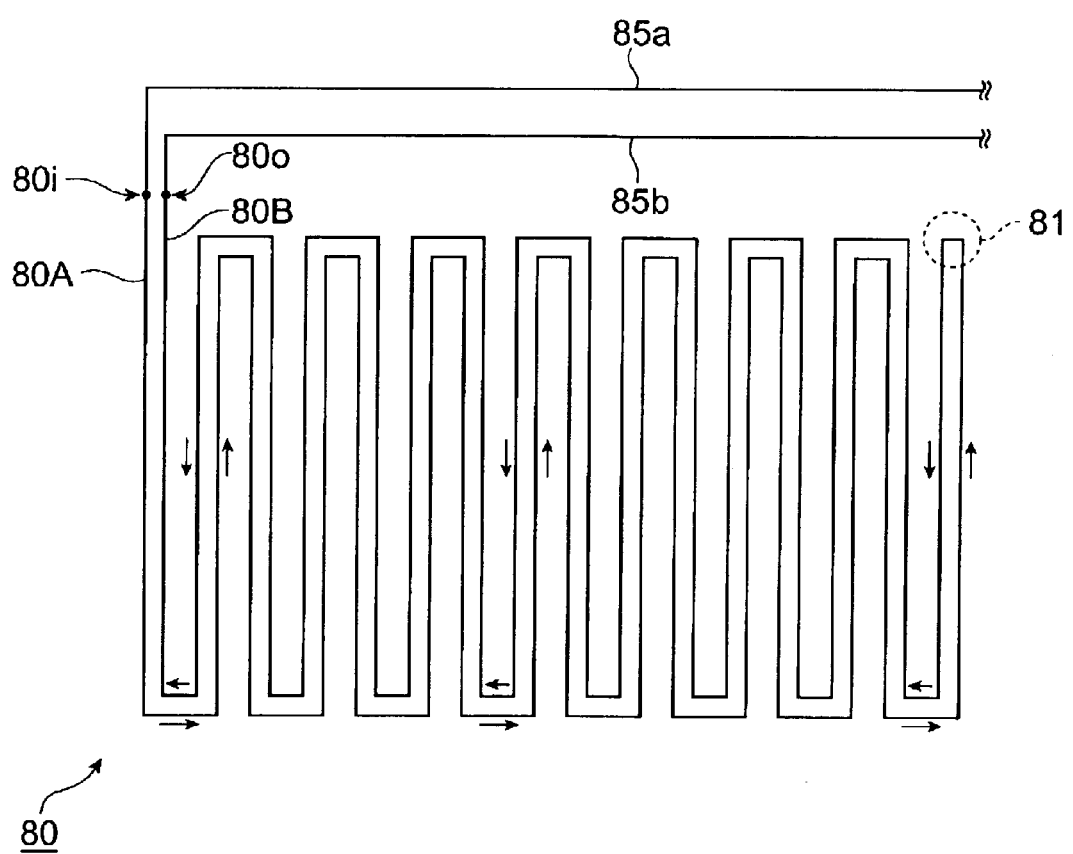
FIG. 7 is a view showing another embodiment of the heat-generating layer.

Referring to FIG. 7, another example of the heat-generating layer 80 will now be explained. The heat-generating layer 80 in this example has a structure in which a single line winds after turning at a turning point 81. An input part 80i for inputting a current by way of an extraction electrode 85a and an output part 80o for outputting the current by way of an extraction electrode 85b are positioned close to each other on the side where the turning point 81 is located in the heat-generating layer 80 and the opposite side, respectively. The part 80A of line extending from the input part 80i to the turning point 81 is substantially parallel to the part of line 80B extending from the turning point 81 to the output part 80o.

Thus configured heat-generating layer 80 yields the following effects. Namely, when the heat-generating layer 80 is energized in the direction indicated by arrows in the drawing, respective magnetic fields generated near the neighboring turned line parts 80A and 80B cancel each other out as can be seen from Ampere's corkscrew rule, whereby the GMR device 40 can be restrained from sensing unnecessary magnetic fields.

Figure 8:
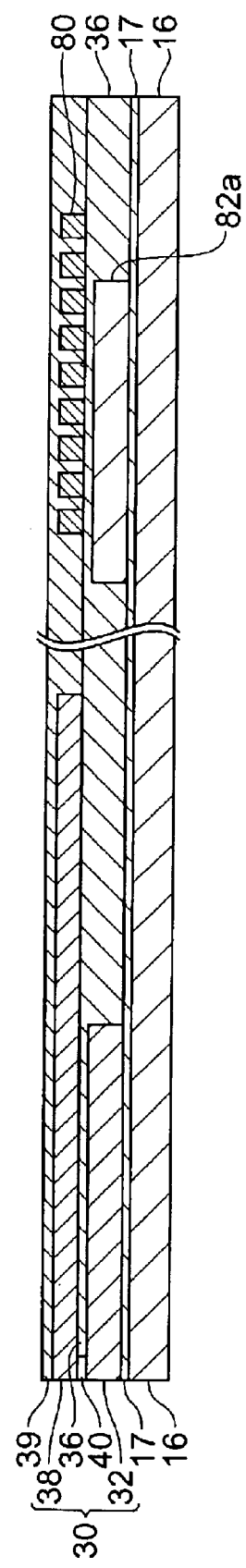
FIG. 8 is a view showing a step of making a thin-film magnetic head.
Figure 9:
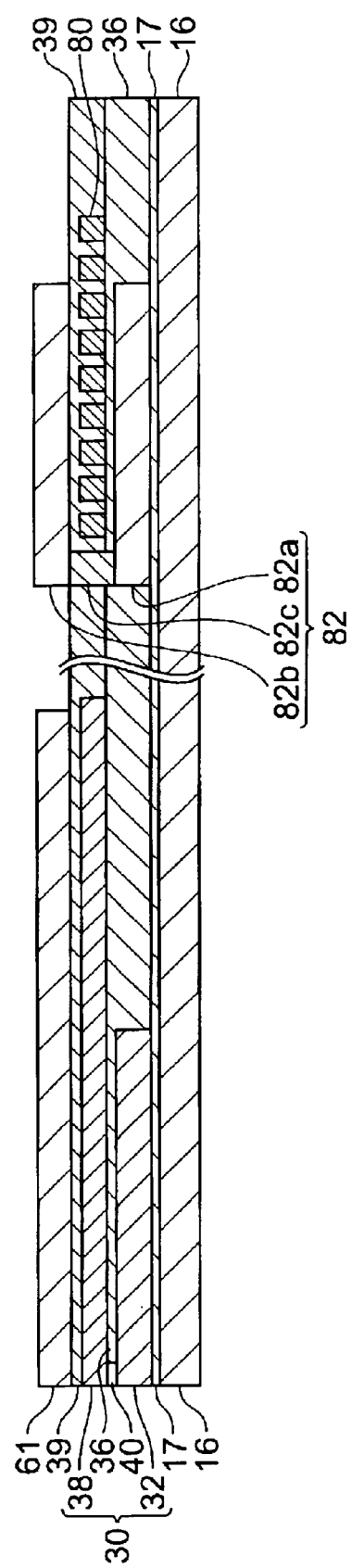
FIG. 9 is a view showing a step of making the thin-film magnetic head.
Figure 10:
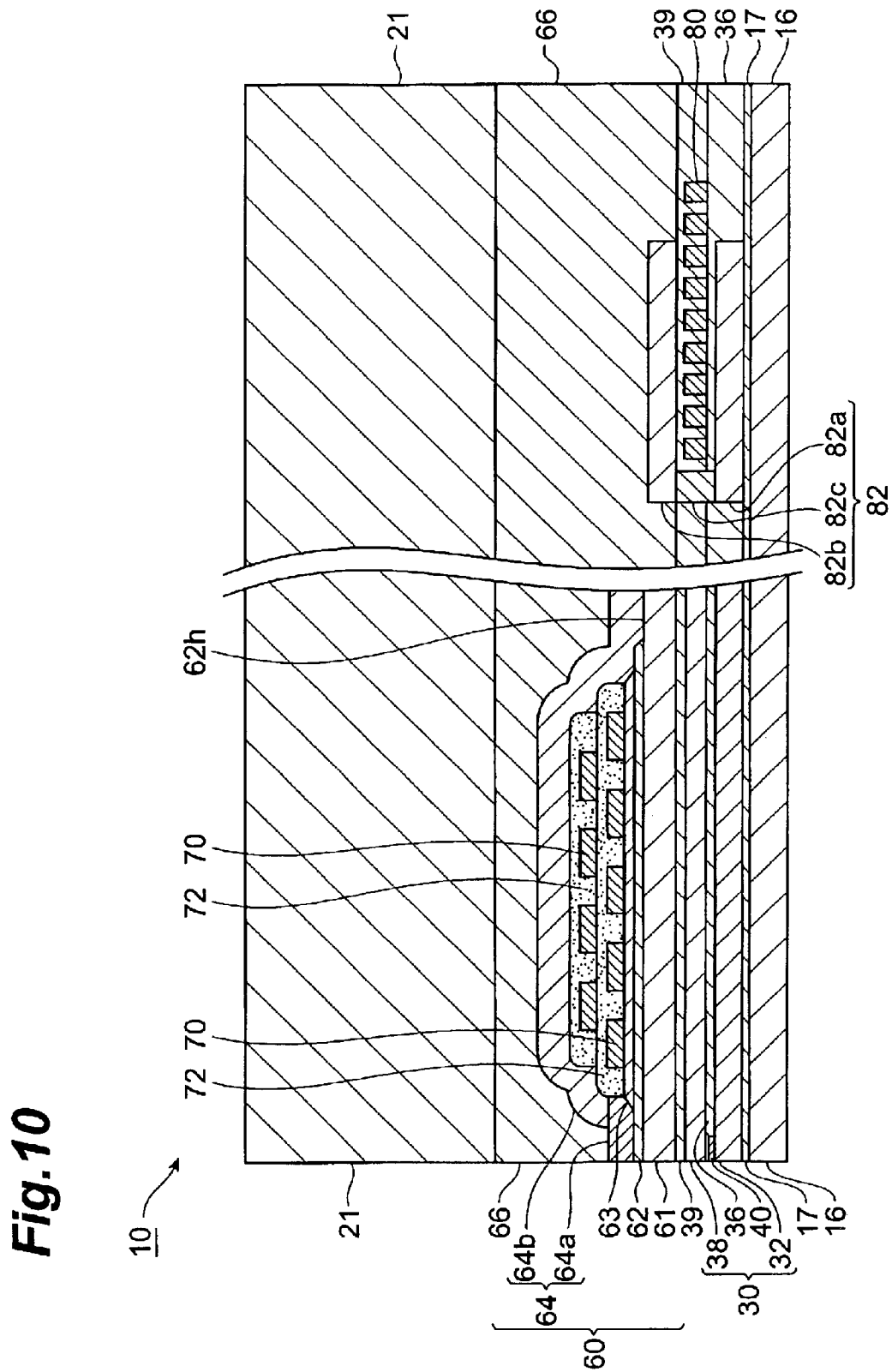
FIG. 10 is a view showing a state where the thin-film magnetic head is completed.

Referring to FIGS. 8 to 10, an example of the method of making the thin-film magnetic head shown in FIG. 3 will now be explained. Here, the explanation will be simplified for the known manufacturing steps.

First, on a substrate 16 made of AlTiC ($Al_2O_3$.TiC) or the like, an undercoat layer 17 made of an insulating material such as ($Al_2O_3$), for example, is formed with a thickness of about 1 $\mu$m to about 10 $\mu$m by sputtering. The substrate 16 and undercoat layer 17 will later become the support 11a for a head slider. Subsequently, on the undercoat layer 17, a lower shield layer 32 made of a magnetic material such as permalloy is formed with a thickness of about 1 $\mu$m to about 3 $\mu$m, for example, by plating. While forming the lower shield layer 32, a first layer 82a of the shield layer 82 (see FIG. 3) made of a magnetic material such as permalloy is also formed on the undercoat layer 17 by the same process (e.g., plating) that used for making the lower shield layer 32. The height of the first layer 82a is on a par with that of the lower shield layer 32. When the lower shield layer 32 and the first layer 82a are made of the same material, they can be formed at the same time. Thereafter, the surface is filled with an insulating layer of alumina or the like except for the part formed with the lower shield layer 32 and first layer 82a, until the lower shield layer 32 and the surface are substantially flush with each other.

Next, a GMR device 40 is formed on the lower shield layer 32 by a known technique. The GMR device 40 is depicted as a single layer in the drawings although it is constituted by a plurality of films in practice. Subsequently, an insulating layer 36 made of $Al_2O_3$ or the like is formed by sputtering, for example, so as to cover the lower shield layer 32 and GMR device 40. In FIG. 8, the insulating layer laminated here and the above-mentioned insulating layer already surrounding the lower shield layer 32a and first layer 82a are integrally shown as the insulating layer 36.

Then, an upper shield layer 38 is formed with a thickness of about 1.0 $\mu$m to about 4.0 $\mu$m by plating, for example, so as to cover the GMR device 40 and the insulating layer 36. While forming the upper shield layer 38, a heat-generating layer 80 made of Cu, NiFe, Ta, Ti, CoNiFe alloy, FeAlSi alloy, or the like is also formed on the insulating layer 36 by the same process (e.g., plating) that used for making the upper shield layer 38. The height of the heat-generating layer 80 is on a par with that of the upper shield layer 38, for example. When the upper shield layer 38 and the heat-generating layer 80 are made of the same material, they can be formed at the same time. In the process of forming the heat-generating layer 80, the extraction electrodes 85a, 85b shown in FIG. 4 maybe formed by sputtering, for example.

Thereafter, on the upper shield layer 38 and heat-generating layer 80, an insulating layer 39 made of an insulating material such as $Al_2O_3$ is formed with a thickness of about 0.1 $\mu$m to about 0.5 $\mu$m by sputtering, for example. A reproducing head section 30 is thus obtained.

Referring to FIG. 9, the next manufacturing step will be explained. After the insulating layer 39 is formed, a through hole is formed by photolithography and dry etching, for example, above the end part on the GMR device 40 side of the first layer 82a in the insulating layer 39 and lower insulating layer 36. Then, within the through hole, a third layer 82c of the shield layer 82 is formed, for example, by sputtering. Preferably, the third layer 82c is made of the same material that used for making the first layer 82a.

Subsequently, on the insulating layer 39, a lower magnetic pole 61 made of permalloy is formed, for example, by sputtering. While forming the lower magnetic pole 61, a second layer 82b is also formed from the same material that used for the first layer 82a by the same process (e.g., sputtering) that used for making the lower magnetic pole 61, so as to complete the shield layer 82. The height of the second layer 82b of the shield layer 82 is on a par with that of the lower magnetic pole 61, for example. When the second layer 82b and the lower magnetic pole 61 are made of the same material, they can be formed at the same time.

In this embodiment, as mentioned above, the lower shield layer 32 and the first layer 82a in the shield layer 82 are formed on the same layer (undercoat layer 17), the upper shield layer 38 and heat-generating layer 80 are formed on the same layer (insulating layer 36), and the lower magnetic pole 61 and second layer 82b are formed on the same layer (insulating layer 39). Therefore, individual layers located on the same layer can be formed by the same process, whereby a thin-film magnetic head can be made easily.

Referring to FIG. 10, a subsequent manufacturing step will be explained. First, a nonmagnetic layer 62 is formed on the lower magnetic pole 61, for example, by sputtering, and then a photoresist layer 63 is formed on the nonmagnetic layer 62. The nonmagnetic layer 62 is formed with a contact hole 62h by photolithography and dry etching. A first stage of thin-film coil 70 is formed on the photoresist layer 63 with a thickness of about 1 $\mu$m to about 3 $\mu$m by utilizing photolithography and plating, and then a photoresist layer 72 is formed on the thin-film coil 70. A part of the thin-film coil 70 is located between the lower magnetic pole 61 and upper magnetic pole 64.

After the first stage of thin-film coil 70 is formed, a magnetic pole part layer 64a of the upper magnetic pole 64 is formed, and then a second layer of thin-film coil 70 is formed. Thereafter, the nonmagnetic layer 62 is etched at a position corresponding to the center part of the thin-film coil 70, so as to form a contact hole 62h, whereby a yoke part layer 64b to become the rear side part of the upper magnetic pole 64 is formed. Though two stages each of thin-film coil 70 and photoresist layer 72 are laminated in this embodiment, the number of stages and their forming procedure are not limited thereto.

Next, a nonmagnetic layer 66 is formed so as to cover the upper magnetic pole 64 and the shield layer 82. The electrically conductive parts 84a, 84b shown in FIG. 3 can be formed by a technique outlined in the following. Namely, after the heat-generating layer 80 and the extraction electrodes 85a, 85b (see FIG. 4) are formed, a resist pattern is formed such that the extraction electrodes 85a, 85b are not covered with subsequent laminate layer materials. Then, the resist pattern is lifted off, for example, after forming the nonmagnetic layer 66. Subsequently, the electrically conductive parts 84a, 84b are formed by frame plating, for example, and their upper end parts are provided with electrode pads 86a, 86b.

Thus, a recording head section 60 is obtained. Subsequently, an overcoat layer 21 made of an insulating material such as $Al_2O_3$ is formed with a thickness of about 20 µm to about 30 µm by sputtering, for example, whereby a thin-film magnetic head 10 of this embodiment is completed.

Since a plurality of thin-film magnetic heads 10 are formed on a single substrate 16 at this stage, the substrate 16 is initially cut, so as to yield a plurality of bars each comprising a row of thin-film magnetic heads 10. Subsequently, each bar is cut into blocks each having a thin-film magnetic head 10. Then, a slider rail is formed by ion milling or the like, whereby the head slider 11 shown in FIG. 2 is obtained. The head slider 11 is mounted on the gimbals 12, which are then connected to the suspension arm 13, whereby the head gimbal assembly 15 shown in FIG. 1 is obtained. Thus formed head gimbal assembly 15 is then assembled such that the head slider 11 is movable over the hard disk 2 while being able to record and reproduce magnetic signals, whereby the hard disk drive 1 shown in FIG. 1 is completed.

Such head gimbal assembly 15 and hard disk drive 1 comprise the above-mentioned thin-film magnetic head 10, and thus can reduce the gap between the GMR device 40 and the hard disk 2, thereby being able to obtain a high reproducing output.

Though the invention achieved by the inventors is specifically explained with reference to embodiments in the foregoing, the present invention should not be restricted thereto. For example, the second magnetic pole may be made integral without being separated into the magnetic pole part layer and the yoke part layer.

Figure 11:
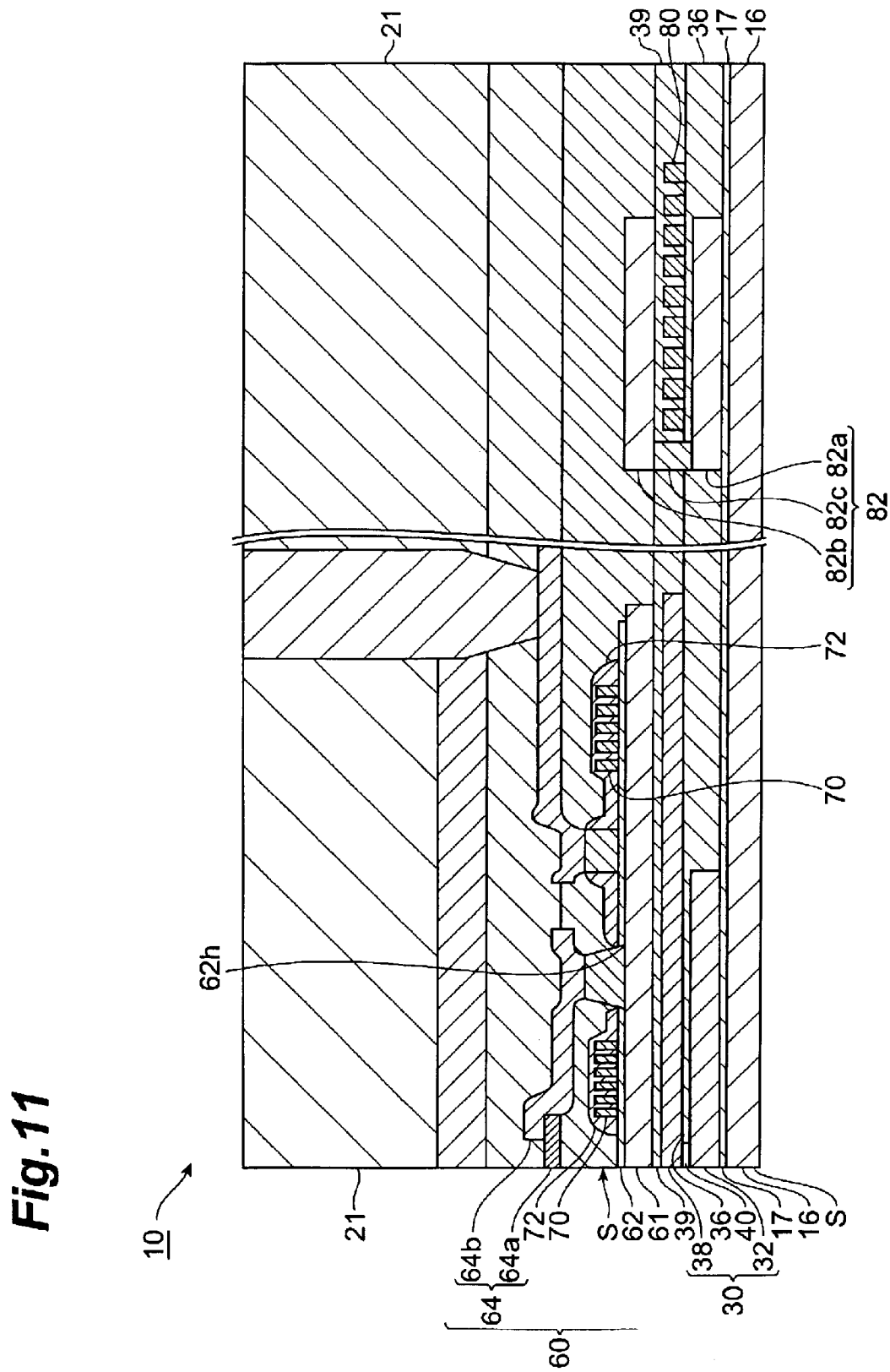
FIG. 11 is a view showing a modified example of the thin-film magnetic head.

Also, the thin-film magnetic head may be not only of in-plane recording type but of perpendicular recording type. FIG. 11 shows an example of thin-film magnetic head employing a perpendicular recording scheme. The depicted thin-film magnetic head 10 performs perpendicular recording with respect to a recording medium by using a leakage magnetic field occurring between a main magnetic pole 64 acting as the second magnetic pole and an auxiliary magnetic pole 61 acting as the first magnetic pole. A heat-generating layer 80 is formed at a position closer to the end part on the air bearing surface S side of the GMR device 40 than the midpoint between the main magnetic pole 64 and auxiliary magnetic pole 61 in the air bearing surface S. Therefore, the amount of thermal expansion caused by the heat from the heat-generating layer 80 is greater in the GMR device 40 than in the electromagnetic transducer. This reduces the gap between the GMR device 40 and the recording medium, whereby a high reproducing output can be obtained.

Also, in the reproducing head section, AMR (Anisotropic Magneto Resistive) devices utilizing an anisotropic magnetoresistive effect, TMR (Tunnel-type Magneto Resistive) devices utilizing a magnetoresistive effect occurring at a tunnel junction, and the like may be utilized in place of the GMR device.

In the present invention, as explained in the foregoing, the amount of thermal expansion caused by the heat from the heat-generating layer becomes greater in the magnetoresistive device than in the electromagnetic transducer, so that the gap between the magnetoresistive device and the recording medium is reduced, whereby a high reproducing output can be obtained.

The basic Japanese Application No. 2002-181810 filed on Jun. 21, 2002 is hereby incorporated by reference.

What is claimed is:

1. A thin-film magnetic head comprising:
   a magnetoresistive device for reading;
   an induction type electromagnetic transducer for writing; and
   a heat-generating layer adapted to generate heat when energized;
   said heat-generating layer being formed at a position closer to an end part on a side facing a recording medium in said magnetoresistive device than an end part on the side facing the recording medium in said electromagnetic transducer.

2. A thin-film magnetic head according to claim 1, wherein said electromagnetic transducer comprises a first magnetic pole; and a second magnetic pole, magnetically connected to said first magnetic pole, holding said first magnetic pole between said second magnetic pole and said magnetoresistive device;
   a distance between said heat-generating layer and said end part on the side facing the recording medium in said magnetoresistive device being shorter than a distance between said heat-generating layer and a midpoint between said first and second magnetic poles on the side facing the recording medium.

3. A thin-film magnetic head according to claim 1, wherein said heat-generating layer is formed on a side opposite from the side facing the recording medium in said magnetoresistive device.

4. A thin-film magnetic head according to claim 1, wherein said magnetoresistive device is disposed between a lower shield layer formed from a magnetic material and an upper shield layer formed from a magnetic material;
   said heat-generating layer and said lower shield layer being formed on the same layer.

5. A thin-film magnetic head according to claim 1, wherein said heat-generating layer and said magnetoresistive device are formed on the same layer.

6. A thin-film magnetic head according to claim 1, wherein said magnetoresistive device is disposed between a lower shield layer formed from a magnetic material and an upper shield layer formed from a magnetic material;
   said heat-generating layer and said upper shield layer being formed on the same layer.

7. A thin-film magnetic head according to claim 1, wherein said heat-generating layer is formed between said magnetoresistive device and said electromagnetic transducer.

8. A thin-film magnetic head according to claim 1, wherein said magnetoresistive device is positioned between said electromagnetic transducer and a predetermined support; and wherein said heat-generating layer is formed between said support and said magnetoresistive device.

9. A thin-film magnetic head according to claim 1, wherein a shield layer formed from a magnetic material is formed between said heat-generating layer and said magnetoresistive device.

10. A thin-film magnetic head according to claim 9, wherein said shield layer comprises a first layer covering at least a part of one side of said heat-generating layer; a second layer covering at least a part of the other side of said heat-generating layer; and a third layer, positioned on the side facing the recording medium in said heat-generating layer, connecting said first and second layers to each other.

11. A thin-film magnetic head according to claim 10, wherein said magnetoresistive device is disposed between a lower shield layer formed from a magnetic material and an upper shield layer formed from a magnetic material;

wherein said lower shield layer and said first layer of said shield layer are formed on the same layer; and wherein said upper shield layer and said heat-generating layer are formed on the same layer.

12. A thin-film magnetic head according to claim 1, wherein said heat-generating layer has a structure comprising a line winding after turning at a predetermined position.

13. A head gimbal assembly comprising a thin-film magnetic head;

said thin-film magnetic head comprising a magnetoresistive device for reading, an induction type electromagnetic transducer for writing, and a heat-generating layer adapted to generate heat when energized;

said heat-generating layer being formed at a position closer to an end part on a side facing a recording medium in said magnetoresistive device than an end part on the side facing the recording medium in said electromagnetic transducer.

14. A hard disk drive comprising a thin-film magnetic head;

said thin-film magnetic head comprising a magnetoresistive device for reading, an induction type electromagnetic transducer for writing, and a heat-generating layer adapted to generate heat when energized;

said heat-generating layer being formed at a position closer to an end part on a side facing a recording medium in said magnetoresistive device than an end part on the side facing said recording medium in said electromagnetic transducer.

* * * * *